United States Patent
Worthington

(10) Patent No.: US 11,524,341 B2
(45) Date of Patent: Dec. 13, 2022

(54) METHOD AND APPARATUS FOR RETAINING A TOOL IN A TOOL HOLDER WITH DEFINED CONTACT SURFACES

(71) Applicant: Techniks, LLC, Indianapolis, IN (US)

(72) Inventor: Scott Worthington, Flat Rock, IN (US)

(73) Assignee: Techniks, LLC, Indianapolis, IN (US)

( * ) Notice: Subject to any disclaimer, the term of this patent is extended or adjusted under 35 U.S.C. 154(b) by 0 days.

(21) Appl. No.: 17/716,591

(22) Filed: Apr. 8, 2022

(65) Prior Publication Data

US 2022/0362862 A1   Nov. 17, 2022

Related U.S. Application Data

(60) Provisional application No. 63/187,518, filed on May 12, 2021.

(51) Int. Cl.
*B23B 31/117*   (2006.01)
*B23B 31/22*   (2006.01)

(52) U.S. Cl.
CPC ........ *B23B 31/1179* (2013.01); *B23B 31/223* (2013.01); *B23B 2240/28* (2013.01); *Y10T 279/17957* (2015.01)

(58) Field of Classification Search
CPC .............. B23B 31/1179; B23B 31/223; B23B 2240/28; Y10T 279/17957; Y10S 279/903
See application file for complete search history.

(56) References Cited

U.S. PATENT DOCUMENTS

| | | | | | |
|---|---|---|---|---|---|
| 973,345 | A | * | 10/1910 | Dalton | B23B 31/223 |
| | | | | | 279/72 |
| 1,026,187 | A | * | 5/1912 | Wahlstrom | B23B 31/223 |
| | | | | | 279/72 |
| 2,466,315 | A | * | 4/1949 | Johansson | B23B 31/223 |
| | | | | | 279/74 |
| 3,169,778 | A | * | 2/1965 | Matsuda | B23B 31/223 |
| | | | | | 279/107 |
| 5,577,743 | A | * | 11/1996 | Kanaan | B23B 31/223 |
| | | | | | 279/81 |
| 8,505,893 | B2 | * | 8/2013 | Haimer | B23B 31/1071 |
| | | | | | 408/239 R |
| 8,668,411 | B2 | * | 3/2014 | Guy | B23B 31/107 |
| | | | | | 279/81 |
| 9,061,356 | B2 | * | 6/2015 | Haimer | B23B 31/1177 |
| 9,254,525 | B2 | * | 2/2016 | Mizoguchi | B23B 31/1179 |
| 9,878,376 | B2 | * | 1/2018 | Haimer | B23B 31/1179 |
| 10,022,806 | B2 | * | 7/2018 | Langbein | B23B 31/1179 |
| 2011/0156363 | A1 | * | 6/2011 | Haimer | B23B 31/1179 |
| | | | | | 279/20 |

FOREIGN PATENT DOCUMENTS

| | | | | | |
|---|---|---|---|---|---|
| DE | | 877530 C | * | 5/1953 | |
| DE | 102013108999 | A1 | * | 2/2014 | ........... B23B 31/008 |

(Continued)

*Primary Examiner* — Eric A. Gates
(74) *Attorney, Agent, or Firm* — Shuttleworth & Ingersoll, PLC; Jason R. Sytsma

(57) ABSTRACT

A plurality of friction rods each of which is positioned in a hole around the retaining bore with a portion of each of the plurality of friction rods partially protruding into the retaining bore for directly engaging the shank of the tool for holding the shank of the tool in the retaining bore at the defined contact surfaces.

11 Claims, 5 Drawing Sheets

(56) References Cited

FOREIGN PATENT DOCUMENTS

| | | | | | |
|---|---|---|---|---|---|
| DE | 202020102054 | U1 | * | 5/2020 | ............. B23B 31/02 |
| FR | 634924 | A | * | 3/1928 | |
| FR | 877581 | A | * | 12/1942 | |
| GB | 580438 | A | * | 9/1946 | |
| WO | WO-2005097382 | A1 | * | 10/2005 | ......... B23B 31/1261 |

* cited by examiner

METHOD AND APPARATUS FOR RETAINING A TOOL IN A TOOL HOLDER WITH DEFINED CONTACT SURFACES

CROSS-REFERENCE TO RELATED APPLICATIONS

This application claims the benefit of U.S. Provisional Patent Application No. 63/187,518 filed May 12, 2021, which is incorporated herein by reference.

TECHNICAL FIELD

This disclosure relates to a shrink-fit tool holder, and more specifically, this disclosure relates to a method and apparatus for retaining a tool in a shrink-fit tool holder by defined contact surfaces around the circumference of the bore of the tool holder to mechanically lock the tool to the tool holder.

BACKGROUND INFORMATION

A machining center is a computer numerical control (CNC) machining tool with an automatic tool-changing function. The machining center can automatically perform various working such as milling, drilling or notching, boring, tapping, etc. on works set thereto with improved efficiency. A tool holder comprises generally of a tapered portion adapted to be connected to a spindle of a machining center, a manipulator-engaging portion, and a tool holding section for firmly holding the tool.

One type of tool holder is a shrink-fit tool holder, which can firmly hold a tool with excellent dynamic balancing suitable for high-speed work. The shrink-fit tool holder comprises of a tapered connecting portion, a manipulator-engaging portion, and a tool holding section for firmly holding a tool. A shank of the tool is inserted into an aperture of the tool holding section and secured by shrinkage fitting.

The conventional shrink-fit tool holders utilize differences in thermal expansion coefficients between the tool-holding sections and the tool shanks. The tool shanks are made of materials having low thermal expansion coefficients such as sintered carbides, high speed steel, etc., while the tool-holding sections are made of high-expansion materials such as hot work tool steel, nickel-chromium steel, etc.

In these prior art tool holders, the tool shank and the aperture of the tool-holding sections have suitably controlled sizes to achieve detachability, thereby minimizing the heating for shrinkage fitting and thus preventing decrease in strength and hardness of materials due to change in their structures. However, in the conventional shrinkage-fit tool holders, the difference in a thermal expansion coefficient between the tool-holding member and the tool shank is insufficient, thereby creating opportunities for a failure to achieve a sufficient gripping strength or a failure to extract the tool.

Accordingly, there is a need for a method and apparatus for retaining a tool in a shrink-fit tool holder.

SUMMARY

Disclosed is a tool holder comprising: a first section adapted to be connected to a machining center; a tool holding section for receiving and holding a shank of a tool therein, wherein the tool holding section comprises of a solid body with an axis of rotation extending there through; an outer diameter surface around the solid body; a front face perpendicular to the axis of rotation; a retaining bore centered on the axis of rotation and extending from the front face into the solid body for receiving and holding the shank of the tool therein; and a plurality of friction rods each of which is positioned in a hole around the retaining bore with a portion of each of the plurality of friction rods partially protruding into the retaining bore for directly engaging the shank of the tool for holding the shank of the tool in the retaining bore at the defined contact surfaces.

In an embodiment, the hole around the retaining bore for receiving the friction rod is formed in the front face of the solid body and extends into the solid body parallel to the axis of rotation, and into which the friction rod of the plurality of friction rods is fixed.

In another embodiment, the plurality of friction rods are replaced with a plurality of defined contact surfaces. The defined contact surfaces can be formed integral with and as a single piece of material with the solid body. The plurality of defined contact surfaces can each partially protrude in the retaining bore for directly engaging the shank of the tool for holding the shank of the tool in the retaining bore at the defined contact surfaces. In such an implementation, a plurality of depressions can be formed in the face of the solid body oriented around the bore and comprising between two depressions one of the plurality of defined contact surfaces for directly engaging the shank of the tool for holding the shank of the tool in the retaining bore at the defined contact surfaces.

In another embodiment, a method for creating a shrink-fit tool holder for retaining a shank of a tool is disclosed. The method can comprise of forming in a front face of a tool holding section centered on a rotational axis a retaining bore for holding the shank of the tool; and forming in the front face of the tool holding section of the shrink-fit tool holder a plurality of defined contact surfaces each partially protruding in the retaining bore for directly engaging the shank of the tool for holding the shank of the tool in the retaining bore at the defined contact surfaces.

In an embodiment, the method comprises of forming a plurality of circumferentially spaced holes around the retaining bore each for receiving a friction rod of a plurality of friction rods. The relative diameter of the plurality of circumferentially spaced holes and the friction rods can be changed, so that the plurality of friction rods can be placed into the corresponding plurality of circumferentially spaced holes. Thereafter, the method continues with fixing the plurality of friction rods in the corresponding plurality of circumferentially spaced holes by allowing a relative diameter of the circumferentially spaced holes and the plurality of friction rods to equalize. The method continues with fixing the shank of the tool into the retaining bore by changing a relative diameter of the shank of the tool and the retaining bore.

In another embodiment, the method comprises of forming a plurality of depressions around the retaining bore wherein one of the plurality of defined contact surfaces is formed between a pair of plurality of depressions such that the plurality of defined contact surfaces are formed integral with and as a single piece of material with the tool holding section. The plurality of defined contact surfaces can each partially protrude into the retaining bore for directly engaging the shank of the tool for holding the shank of the tool in the retaining bore at the defined contact surfaces.

BRIEF DESCRIPTION OF THE DRAWINGS

These and other features and advantages of the present invention will be better understood by reading the following detailed description, taken together with the drawings wherein.

DETAILED DESCRIPTION

Figure 1:
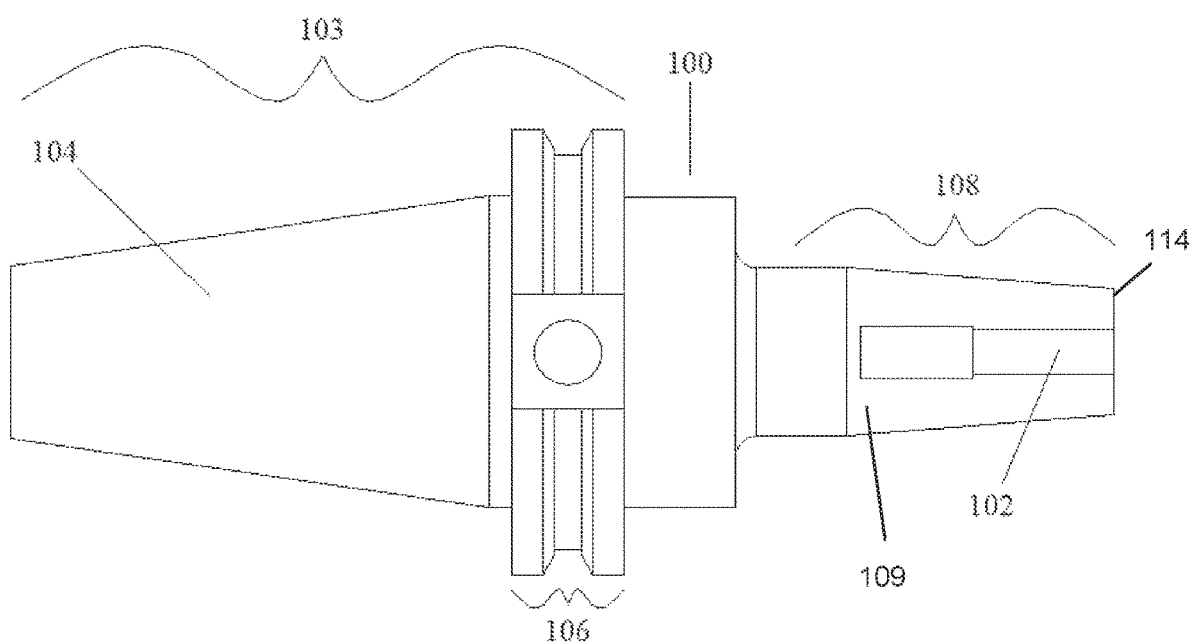
FIG. 1 is a partial cross-sectional side view of a tool holder with a shrink-fit bore according to the prior art.

Referring to FIG. 1, disclosed is a tool holder 100 with a retaining bore 102 that extends from a front face 114 into a solid body 109, which can be shrink-fit onto a tool according to the prior art. Tool holder 100 comprises of a first section 103 adapted to be connected to a machining center (CNC). This first section 103 can include a tapered connecting portion 104 configured to be received by a CNC machine (not shown) and a manipulator-engaging portion 106 is designed to be engaged by a clamping system in the CNC machine to hold firmly tool holder 100 to the CNC machine spindle. A tool holding section 108 can firmly hold a tool 110 (shown in FIG. 3) to the tool holder 100. A shank of the tool is inserted into retaining bore 102 of tool holding section 108 and secured by shrink fitting.

This disclosure is directed to providing a consistent and even pressure to the shank of the tool 110. The grip of the tool holder 100 is improved by providing in retaining bore 102 of tool holding section 108 a plurality of circumferentially placed defined contact surfaces 111 to provide a mechanical lock of the shank of tool 110. These defined contact surfaces 111 protrude into retaining bore 102 and directly contact and hold tool 110. While any number of defined contact surfaces 111 could be provided, it is preferable to have three defined contact surfaces 111 protruding into retaining bore 102 to engage tool 110. Three defined contact surfaces 111 creates a triangle of anchor points that will define the position of tool 110, no matter the shape or other imperfections in retaining bore 102 or the shape or imperfections of the shank of tool 110. Each retaining bore is different and each tool is different. This arrangement of defined contact surfaces 111 protruding into retaining bore 102 ensures that the holding pressure on the shank of tool 110 will always be balanced and there will be zero or near zero runout (i.e., rotation of the tool off the axis of rotation of the tool holder.

Defined contact surfaces 111 can be formed in retaining bore 102 so that defined contact surfaces 111 are integral with the surface of retaining bore 102. Alternatively, defined contact surface 111 can form the outer surface of a friction rod 112 which are placed in corresponding holes 113 that are formed in front face 114 of tool holding section 108. In either embodiment, defined contact surfaces 111 directly engage the shank of tool 110 to apply consistent and even pressure on tool 110 to prevent runout.

Figure 2A:
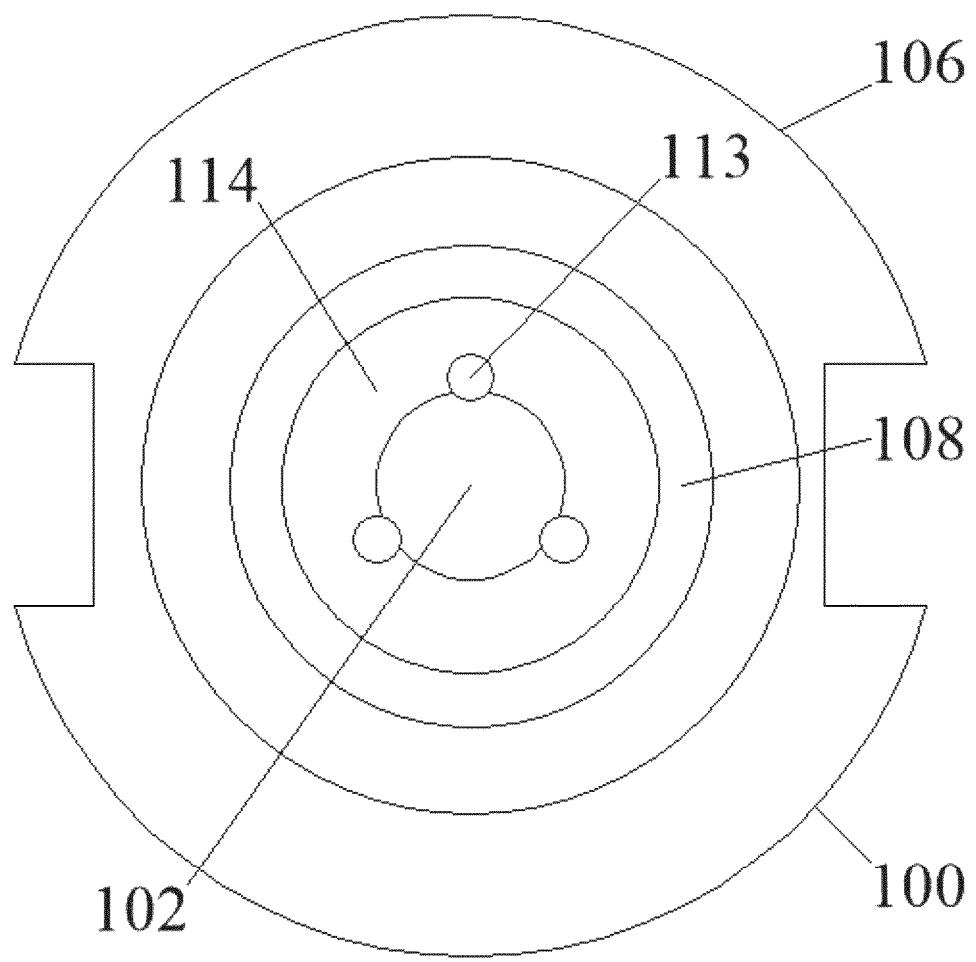
FIG. 2A is a top view of a tool holder with a shrink-fit bore showing the face of the tool holder drilled with a plurality of circumferentially placed holes around the bore.
Figure 2B:
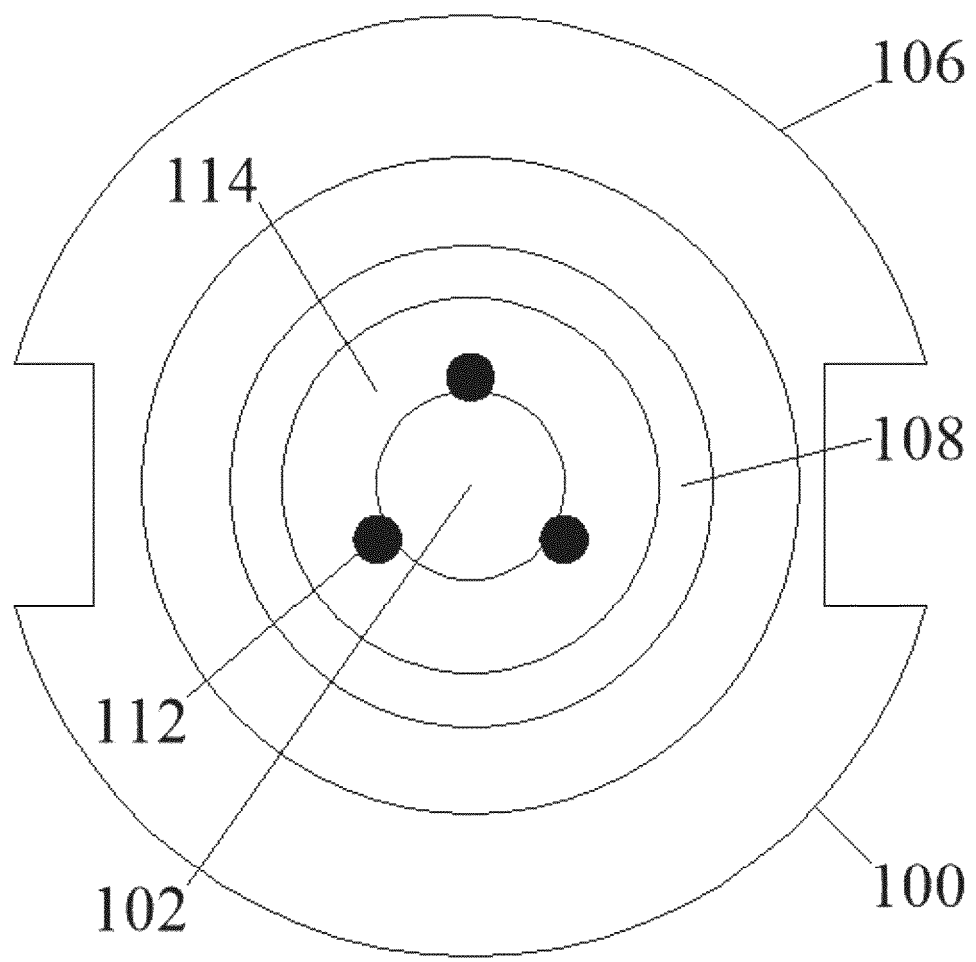
FIG. 2B is a top view of the tool holder of FIG. 2A with friction rods inserted into the circumferentially placed holes and the tool holder heated for insertion or extraction of a tool.

In the embodiment with friction rods 112 and with reference of FIG. 2A, a plurality of circumferentially placed holes 113 are drilled in into front face 114 of tool holding section 108 around retaining bore 102 of tool holder 100. Thereafter, either tool holding section 108 is heated to a temperature sufficient to increase the diameter of holes 113 in order for each of holes 113 to receive a corresponding friction rod 112 and/or friction rods 112 are cooled to decrease their diameter. Once the relative temperature between tool holding section 108 and friction rods 112 returns to ambient temperature, as shown in FIG. 2B, retaining bore 102 has defined contact surfaces 111 corresponding to the location of friction rod 112, which reduces the apparent bore diameter. When tool 110 is inserted into retaining bore 102 (typically by reheating tool holding section 108) and tool holding section 108 returns to its ambient temperature, defined contact surfaces 111 from friction rods 112 press against tool 110 to lock it in place, as shown it FIG. 3.

Friction rods 112 are circumferentially spaced around retaining bore 102 to keep the center of mass for the rotating tool holder 100 along its axis that extends through the center of retaining bore 102. While it is possible to have unequal distribution of friction rods 112 around retaining bore 102, wobbling will occur unless the weight of friction rods 112 are offset with additional weights. For this reason, three (3) friction rods 112 circumferentially placed one-hundred and twenty degrees (120°) apart may be an optimal distribution of friction rods 112; however, any number of a plurality of friction rods 112 can be placed in tool holding section 108; for example 2, 3, 4, 5, 6, 8, etc. Increasing the number of friction rods 112 beyond 3 does not increase the usable bore diameter. Rather, it only provides more points of contact between defined contact surfaces 111 and the tool 110.

Friction rods 112 can be any diameter depending on the size of tool holding section 108 or retaining bore 102 of tool holder 100. The diameter of friction rods 112 should be small enough so that corresponding hole 113 when placed around retaining bore 102 does not structurally degrade tool holding section 108. This can occur, for example, if the distance between friction rod 112 and the outer diameter of tool holding section 108 is too small. Friction rods 112 can each comprise two or more friction rods 112 stacked on top of each other, instead of a single long friction rod 112.

Friction rods 112 can be inserted into tool holding section 108 of tool holder 100 in a number of different manners. The goal is to change the relative diameter of friction rods 112 to holes 113 in front face 114 of tool holding section 108. This can be done, for example, by extreme cooling of friction rods 112 (for example by immersion in dry ice) or by extreme heating of tool holding section 108. Friction rods 112 can also be embedded into holes 113 with extreme force by pressing friction rods 112 into holes 113.

Figure 3:
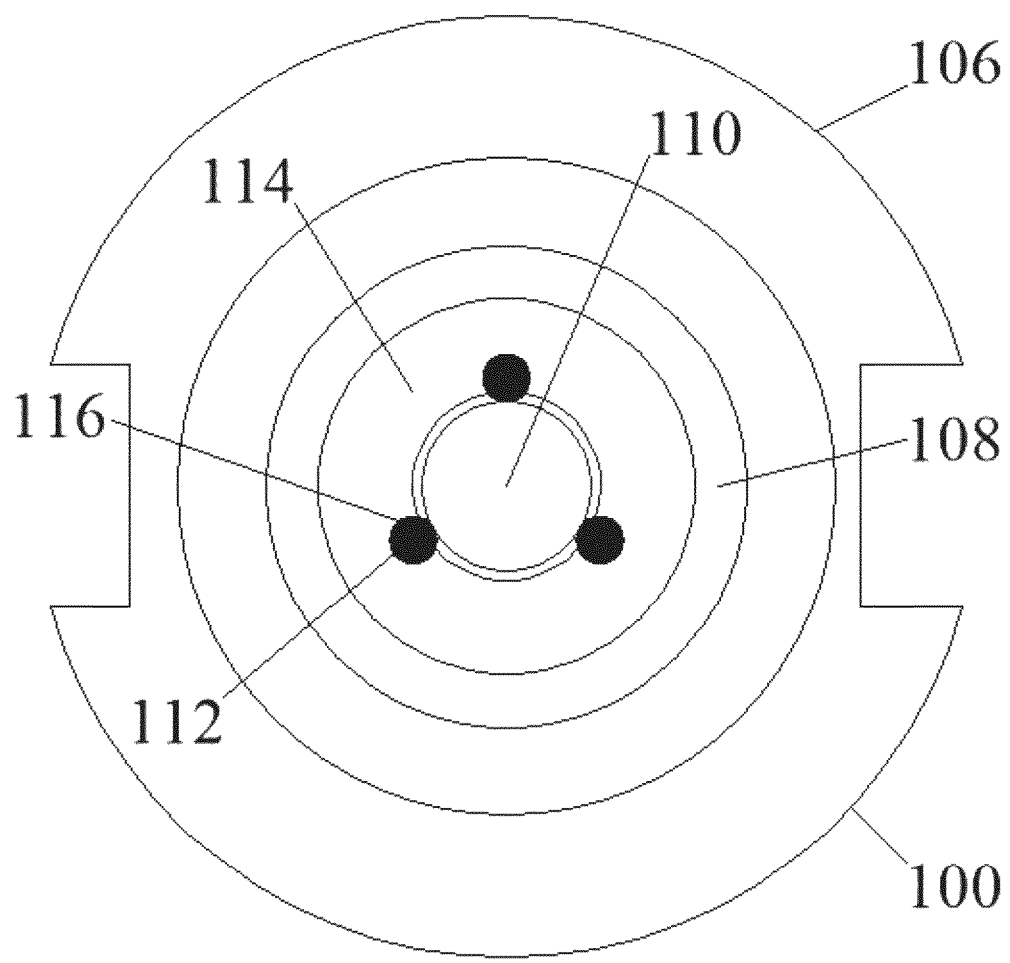
FIG. 3 is a top view of the tool holder of FIG. 2B with a tool in the tool holder.

FIG. 3 shows tool holder 100 with a tool 110 mechanically locked in retaining bore 102 of tool holding section 108. As shown, friction rods 112 create corresponding defined contact surfaces 111 on the surface of retaining bore 102. These defined contact surfaces 111 are the point of contact on the shank of tool 110. In fact, a space 116 remains between the side wall of retaining bore 102 and the shank of tool 110. The benefits of space 116 will be discussed below.

One skilled in the art will know that with respect to shrink fit tool holders high speed steel (H13) or a high chromium alloy tool steel (SKD61) is the most common metal used for production, although stainless steel is also commonly used. Shrink fit tool holders made from any metals with similar characteristics, however, will benefit from the addition of friction rods 112 fixed into tool holding section 108.

It may be advantageous to provide friction rods 112 of a dissimilar material. Friction rods can comprise a cemented carbide material, a ceramic material, or a hardened steel material. In such instances, as described above, solid body 109 of tool holding section 108 may comprise H13, SKD61, or stainless steel. For the purpose of this disclosure, friction rods 112 can comprise any material.

Another advantage is that a portion of material in tool holding section 108 is removed from forming holes 113. This less material means that less heat is required to insert and remove tools 110 from tool holding section 108. Similarly, tool holding section 108 will cool faster.

Figure 4:
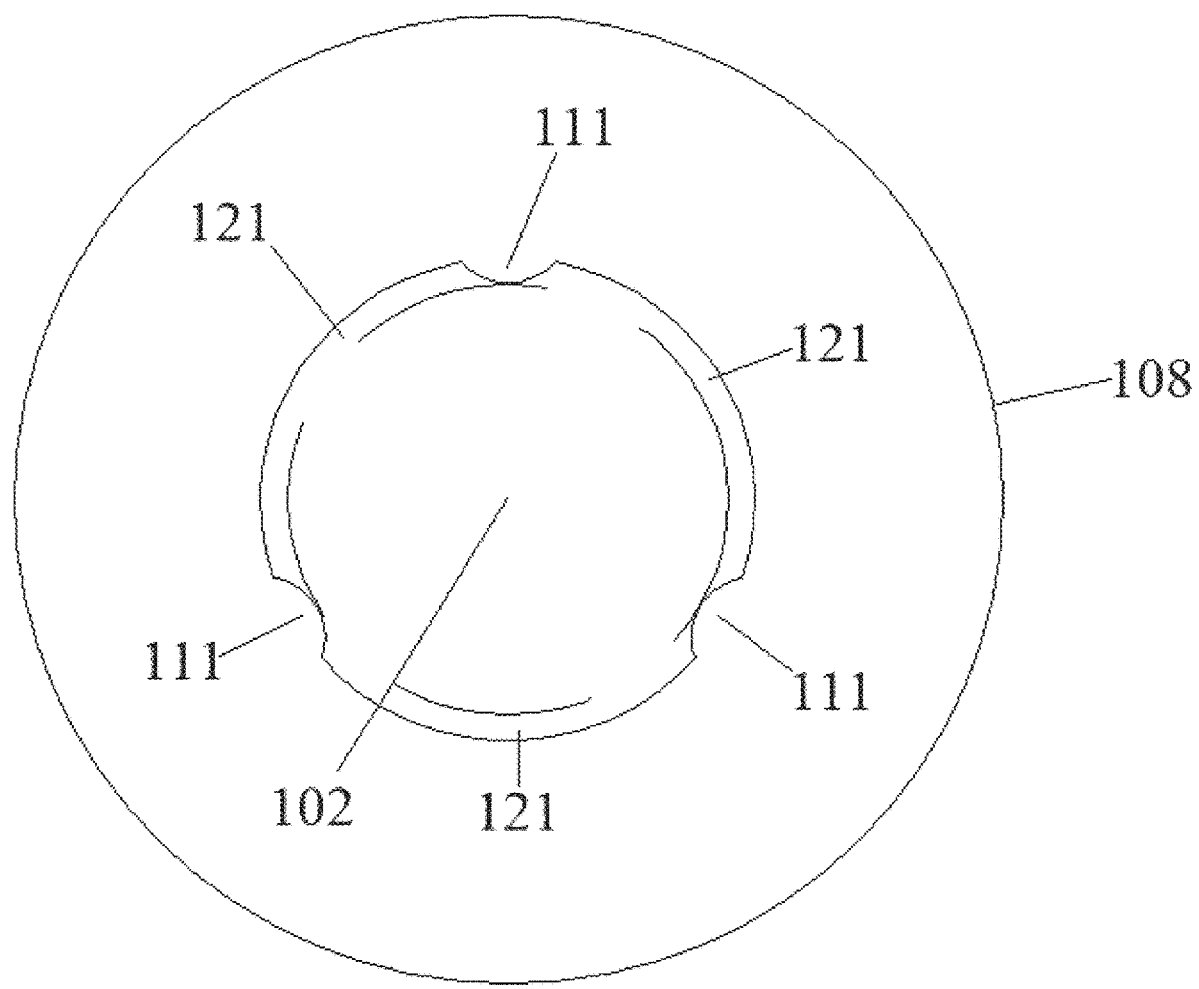
FIG. 4 is a top view of a tool holder according to another implementation.

In another embodiment, as shown in FIG. 4, defined contact surfaces 111 can be formed by machining a small portion 121 of retaining bore 102 away in three positions each one hundred and twenty degrees (120°) apart. The depth of this machining can be very small (<0.0005") or large enough extending the depth of bore 102 for coolant to pass through. The depth can also be any depth between this range. This will not make bore 102 more rigid or impact the vibration like adding friction rods 112, and may also be much cheaper and easier to integrate into tool holder 100. While three small portions 121 are disclosed any number of small portions 121 are contemplated. What is left when small portions 121 are removed, is bore 102 centered on the rotational axis, as in the embodiments discussed above, with three defined contact surfaces 111 extending to the outer-diameter of bore 108 to engage the shank of the tool.

It should also be noted that when tool 110 is difficult to extract from retaining bore 102, operators tend to overheat tool holder 100 to try to increase the expansion of retaining bore 102. This can cause permanent damage to tool holder 100. Friction rods 112 will reduce the number of tool holders damaged by overheating, by providing improved extractability.

If the height of defined contact surfaces 111 is kept very small no coolant will flow around the tool and coolant holes can be added as with any shrink fit tool holder. Increasing the height of defined contact surfaces 111, however, will allow coolant to flow along tool 110. This can provide enhanced cooling of tool 110.

A method for creating a tool holder 100 is also disclosed. The method begins at step 202 and proceeds to step 204 by forming in front face 114 of tool holding section 108 a plurality of circumferentially spaced holes 113 around an axis of rotation of tool holding section 108. Next retaining bore 102 is formed with its center on the axis of rotation. This create a surface of retaining bore 102 that is discontinuous for receiving friction rods 112. At step 206 the relative diameter of holes 113 to friction rods 112 is temporarily changed. This can occur by heating of tool holding section 108 or cooling friction rods 112. The method continues at step 208 by inserting friction rods 112 into holes 113. The method continues at step 210 by fixing friction rods 112 in corresponding holes 113 by allowing the relative diameter of holes 113 to friction rods 112 to return to normal. This creates defined contact surfaces 111 that protrude in retaining bore 102 that can directly engage the shank of tool 110.

The method can continue at step 212 by inserting shank of tool 110 into the retaining bore. At step 214 tool holder is allowed to cool and return to its ambient state with a smaller diameter retaining bore 102 and with defined contact surfaces 111 mechanically locking tool 110 into retaining bore 102. Step 212 can be repeated when it comes time to remove tool 110 from retaining bore 102.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:
1. A tool holder comprising:
a first section adapted to be connected to a machining center;
a tool holding section for receiving and holding a shank of a tool therein, wherein the tool holding section comprises of
a solid body with an axis of rotation extending there through;
an outer diameter surface around the solid body;
a front face perpendicular to the axis of rotation;
a retaining bore centered on the axis of rotation and extending from the front face into the solid body for receiving and holding the shank of the tool therein; and
a plurality of defined contact surfaces extending from the front face and downward parallel with the retaining bore and each having a hardness greater than or equal to the solid body and fixed to and partially protruding into the retaining bore for directly engaging the shank of the tool and for holding the shank of the tool in the retaining bore at the defined contact surfaces.

2. The tool holder of claim 1, wherein the retaining bore is formed with the plurality of defined contact surfaces.

3. The tool holder of claim 1, wherein the defined contact surfaces further comprise a plurality of friction rods equally spaced around the retaining bore wherein a surface of each of the plurality of friction rods is exposed and protrudes in the retaining bore to directly contact the shank of the tool for holding the shank of the tool in the retaining bore.

4. The tool holder of claim 3, wherein the plurality of friction rods each comprise one chosen from a cemented carbide material, a ceramic material, and a hardened steel material.

5. The tool holder of claim 3, and further comprising three friction rods equally spaced around the retaining bore and each with a surface exposed and protruding in the retaining bore for directly contacting the shank of the tool for holding the shank of the tool in the retaining bore.

6. The tool holder of claim 3, further comprising a plurality of holes extending into the front face of the tool holding section around the retaining bore, wherein the plurality of friction rods are positioned in the corresponding plurality of holes.

7. The tool holder of claim 1, and further comprising a space between a wall of the retaining bore and the shank of the tool created by engagement of the plurality of defined contact surfaces directly engaging the shank of the tool.

8. The tool holder of claim 7, wherein the plurality of defined contact surfaces are formed integral with and as a single piece of material with the solid body, wherein the plurality of defined contact surfaces each partially protrude in the retaining bore for directly engaging the shank of the tool for holding the shank of the tool in the retaining bore at the defined contact surfaces.

9. The tool holder of claim 8, and further comprising a plurality of depressions formed in the face of the solid body oriented around the bore and comprising between two depressions one of the plurality of defined contact surfaces.

10. A tool holder comprising:
a first section adapted to be connected to a machining center;

a tool holding section for receiving and holding a shank of a tool therein, wherein the tool holding section comprises of a solid body with an axis of rotation extending there through;

an outer diameter surface around the solid body;

a front face perpendicular to the axis of rotation;

a retaining bore centered on the axis of rotation and extending from the front face into the solid body for receiving and holding the shank of the tool therein; and a plurality of friction rods extending from the front face and downward parallel with the retaining bore and each having a hardness greater than or equal to the solid body and each of which is positioned and fixed in a hole around the retaining bore with a portion of each of the plurality of friction rods partially protruding into the retaining bore for directly engaging the shank of the tool for holding the shank of the tool in the retaining bore at the defined contact surfaces.

11. The tool holder of claim 10, wherein the hole around the retaining bore for receiving the friction rod is formed in the front face of the solid body and extends into the solid body parallel to the axis of rotation, and into which the friction rod of the plurality of friction rods is fixed.

* * * * *